US008427932B2

(12) United States Patent
Inoue et al.

(10) Patent No.: US 8,427,932 B2
(45) Date of Patent: Apr. 23, 2013

(54) OPTICAL RECORDING MEDIUM AND OPTICAL RECORDING-READING METHOD

(75) Inventors: Motohiro Inoue, Tokyo (JP); Takashi Kikukawa, Tokyo (JP); Atsuko Kosuda, Tokyo (JP); Hideki Hirata, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/032,203

(22) Filed: Feb. 22, 2011

(65) Prior Publication Data

US 2011/0205868 A1     Aug. 25, 2011

(30) Foreign Application Priority Data

Feb. 22, 2010   (JP) ................................. 2010-035809

(51) Int. Cl.
*G11B 7/007*     (2006.01)
*G11B 3/70*      (2006.01)
*G11B 7/26*      (2006.01)

(52) U.S. Cl.
USPC ..................... 369/278; 369/44.25; 369/53.28; 369/44.26; 369/279; 369/94

(58) Field of Classification Search ............... 369/44.26, 369/283, 284, 279, 280, 272.1, 44.11, 44.27, 369/53.28, 44.25
See application file for complete search history.

(56) References Cited

U.S. PATENT DOCUMENTS

| 2001/0008506 A1* | 7/2001 | Takeya et al. ............... 369/44.29 |
| 2009/0147652 A1* | 6/2009 | Fujita ............................ 369/100 |
| 2009/0303854 A1* | 12/2009 | Nakatani et al. ................ 369/94 |
| 2009/0316537 A1* | 12/2009 | Nakatani et al. ........... 369/44.14 |
| 2010/0182895 A1* | 7/2010 | Oyamada et al. ............. 369/284 |
| 2010/0290332 A1* | 11/2010 | Shipway et al. .............. 369/284 |
| 2011/0222380 A1* | 9/2011 | Suzuki et al. ............... 369/44.26 |

FOREIGN PATENT DOCUMENTS

| JP | 2008097693 A | 4/2008 |
| JP | 2008097694 A | 4/2008 |
| JP | 2008108383 A | 5/2008 |

OTHER PUBLICATIONS

Ichimura et al., "Proposal for a Multilayer Read-Only-Memory Optical Disc Structure", Applied Optics 45 (8):1794-1803 (2006).
Mishima et al., "150 GB, 6-Layer Write Once Disc for Blu Ray Disc System", Proc. of SPIE 6282 628201-1-628201-11 (2006).

* cited by examiner

*Primary Examiner* — Wayne Young
*Assistant Examiner* — Dionne Pendleton
(74) *Attorney, Agent, or Firm* — Porzio, Bromberg & Newman, P.C.

(57) ABSTRACT

Efficient recording and reading are achieved in an optical recording medium including servo layers and recording and reading layers. The optical recording medium includes: a first servo layer having a projection and a depression for tracking control that are formed in a first spiral direction; a second servo layer having a projection and a depression for tracking control that are formed in a second spiral direction opposite to the first spiral direction; and a plurality of recording and reading layers having a flat structure with no projection and depression for tracking control. Information is recorded on each of the plurality of recording and reading layers while tracking control is performed using the first servo layer or the second servo layer.

20 Claims, 5 Drawing Sheets

OPTICAL RECORDING MEDIUM AND OPTICAL RECORDING-READING METHOD

BACKGROUND OF THE INVENTION

1. Field of the Invention

The present invention relates to an optical recording medium including a plurality of recording and reading layers, and an optical recording-reading method of recording information on the optical recording medium.

2. Description of the Related Art

Conventionally, optical recording media such as CD-DAs, CD-ROMs, CD-Rs, CD-RWs, DVD-ROMs, DVD-Rs, DVD+/−RWs, DVD-RAMs, Blu-ray Discs (BD) are widely used to view digital video contents and to record digital data. In the BD standard, which is one of the next generation DVD standards, the wavelength of the laser beam used for recording and reading is reduced to 405 nm, and the numerical aperture of an objective lens is set to 0.85. In optical recording media conforming to the BD standard, tracks are formed at 0.32 μm pitch. This enables 25 GB or more data to be recorded on and read from one recording and reading layer of such an optical recording medium.

It is expected that the size of video and data files will increase more and more in the future. Therefore, it is contemplated to increase the capacities of optical recording media by using a multiple stack of recording and reading layers. In the technologies for BD standard optical recording media reported by I. Ichimura et al., Appl. Opt., 45, 1974-1803 (2006) and K. Mishima et al., Proc. of SPIE, 6282, 628201 (2006), 6 to 8 recording and reading layers are provided to achieve ultra large capacities as much as 200 GB.

When a multiple stack of recording and reading layers is used in an optical recording medium, projections and depressions, such as grooves and lands, for tracking control are formed on each recording and reading layer, and therefore a stamper (a master die) must be used to form the projections and depressions each time a recording and reading layer is formed. Therefore, as the number of stacked layers increases, the number of times the stamper is used increases, and this may result in an increase in manufacturing cost.

In the technologies for optical recording media recently proposed in Japanese Patent Application Laid-Open Nos. 2008-97693, 2008-97694, and 2008-108383, servo layers are provided separately from recording and reading layers, and information is recorded on each recording and reading layer using a recording laser beam while a tracking signal is obtained from a corresponding one of the servo layers using a servo laser beam. With such technologies, the recording and reading layers need not have projections and depressions (grooves) for tracking information, and a stamper need not be used for the recording and reading layers during manufacturing. This enables a significant reduction in cost. It is also proposed that a plurality of servo layers are used to facilitate aberration correction and to allow two layers to be read simultaneously.

In the optical recording media described in Japanese Patent Application Laid-Open Nos. 2008-97693 and 2008-97694, the amount of spherical aberration correction can be reduced, and therefore recording-reading accuracy can be improved. However, the problems with such optical recording media are that it is difficult to record and read information on/from the media efficiently. More specifically, one of the problems is that, when information is recorded on the recording and reading layers sequentially in their stacking order, the seek time required to change from one recording and reading layer to the next is long. Another problem is that, when two servo layers are used alternately, the beams must be moved considerable distances in a focusing direction between the servo layers and between the recording and reading layers, so that the moving time and adjustment time increase. Yet another problem is that, when the beam for the servo layers and the beam for the recording and reading layers have the same wavelength, the reflected light of the beam for the servo layers may adversely affect recording on and reading from the recording and reading layers and that the reflected light of the beam for the recording and reading layers may adversely affect the tracking control performed using the servo layers. Therefore, mutual interference must be reduced by changing materials and structure design.

The positions of the recording and reading layers of such an optical recording medium in its thickness direction are unknown on the side of an optical pickup that records and reads information on/from the optical recording medium. There are various optical recording media that are different in the number of recording and reading layers. Therefore, each time an optical recording medium is inserted, the point on which the recording laser beam is focused must be moved in the focusing direction to read the position of each recording and reading layer. This results in a problem in that the preparation of recording and reading is time consuming.

SUMMARY OF THE INVENTION

The present invention has been made in view of the above problems, and it is an object of the invention to provide a technology for improving the recording-reading efficiency of an optical recording medium that includes servo layers and recording and reading layers separately.

The present inventors have made extensive studies, and the above object is achieved by the following means.

To achieve the above object, the present invention provides an optical recording medium including: a first servo layer having a projection and a depression for tracking control that are formed in a first spiral direction; a second servo layer having a projection and a depression for tracking control that are formed in a second spiral direction opposite to the first spiral direction; and a plurality of recording and reading layers having a flat structure with no projection and depression for tracking control, information being recorded on each of the plurality of recording and reading layers while tracking control is performed using the first servo layer or the second servo layer.

In the optical recording medium provided to achieve the above object, the plurality of recording and reading layers may include at least three recording and reading layers.

In the optical recording medium provided to achieve the above object, the first and second servo layers may be stacked at positions closer to a light incident surface of the optical recording medium than the plurality of recording and reading layers.

In the optical recording medium provided to achieve the above object, the first and second servo layers may have properties that allow the first and second servo layers to reflect long-wavelength light and to transmit short-wavelength light.

In the optical recording medium provided to achieve the above object, the first and second servo layers may be stacked at positions farther from a light incident surface of the optical recording medium than the plurality of recording and reading layers.

In the optical recording medium provided to achieve the above object, the plurality of recording and reading layers may have properties that allow the plurality of recording and reading layers to reflect short-wavelength light and to transmit long-wavelength light.

In the optical recording medium provided to achieve the above object, interlayer distances between adjacent ones of the at least three recording and reading layers may be set alternately to a first distance and a second distance different from the first distance.

In the optical recording medium provided to achieve the above object, a track pitch of the first servo layer or the second servo layer may be set to a value twice a recording track pitch on the plurality of recording and reading layers to be recorded.

In the optical recording medium provided to achieve the above object, information may be recorded on an adjacent one of the at least three recording and reading layers in the first spiral direction under tracking control using the first servo layer and recorded on another adjacent one of the at least three recording and reading layers in the second spiral direction under tracking control using the second servo layer.

To achieve the above object, the present invention provides an optical recording-reading method used for an optical recording medium including a first servo layer having a projection and a depression for tracking control that are formed in a first spiral direction, a second servo layer having a projection and a depression for tracking control that are formed in a second spiral direction opposite to the first spiral direction, and a plurality of recording and reading layers having a flat structure with no projection and depression for tracking control, the method including irradiating one of the plurality of recording and reading layers with a recording beam to record information on the one of the plurality of recording and reading layers while one of the first and second servo layers is irradiated with a tracking beam to perform tracking control.

In the optical recording-reading method provided to achieve the above object, information may be recorded on an adjacent one of the plurality of recording and reading layers under the tracking control in the first spiral direction using the first servo layer and recorded on another adjacent one of the plurality of recording and reading layers under the tracking control in the second spiral direction using the second servo layer.

In the present invention, two servo layers with different spiral directions are used in the optical recording medium, and this advantageously allows efficient reading and recording to be achieved.

DETAILED DESCRIPTION OF THE PREFERRED EMBODIMENTS

Preferred embodiments of the present invention will next be described with reference to the accompanying drawings.

Figure 1:
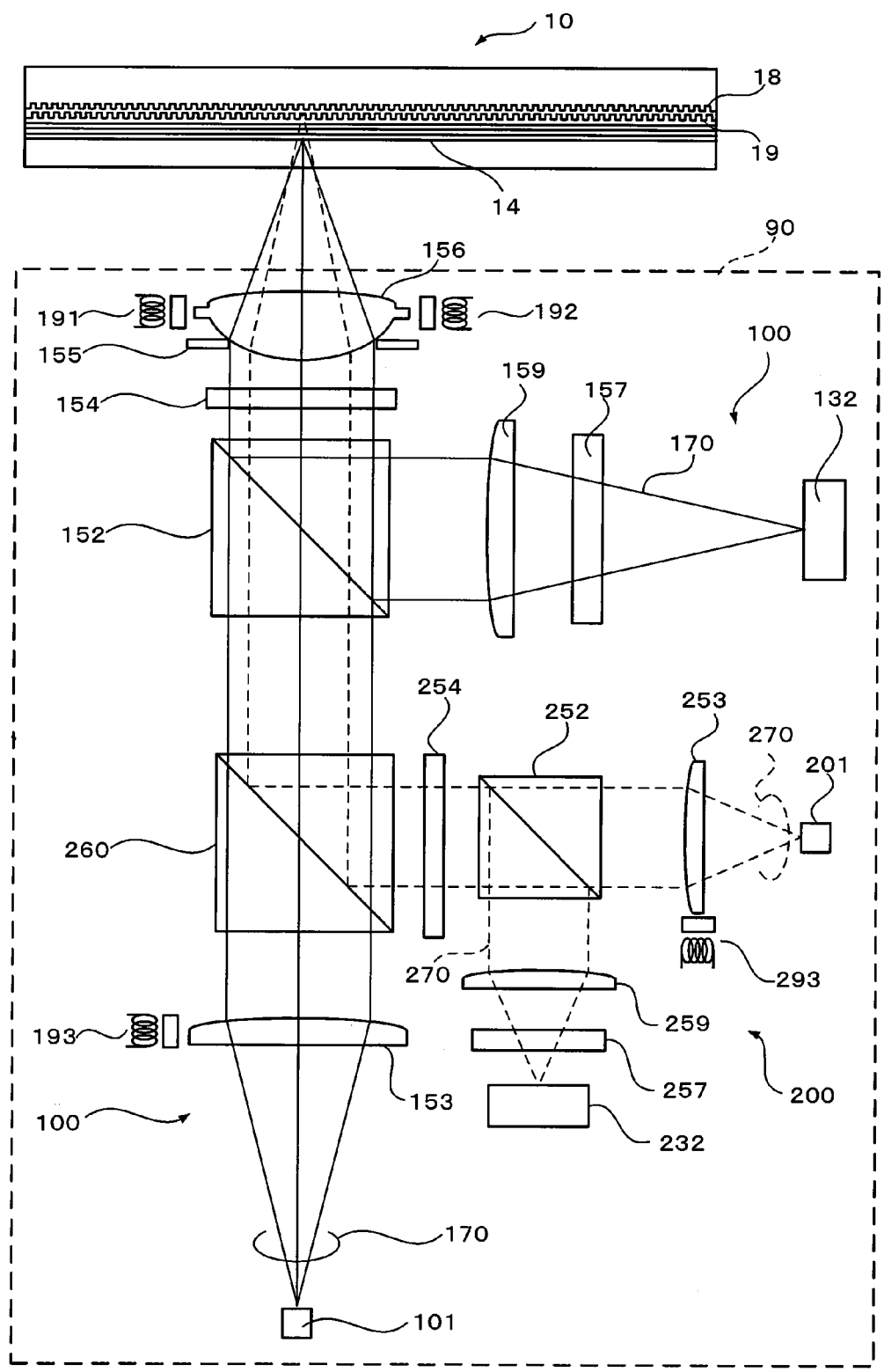
FIG. 1 is a block diagram illustrating the structure of an optical pickup used to record and read an optical recording medium according to an embodiment.

FIG. 1 shows the structure of a first optical recording medium 10 according to an embodiment and the structure of an optical pickup 90 used to record and read the first optical recording medium 10. The optical pickup 90 includes a first optical system 100 and a second optical system 200. The first optical system 100 is used to record and read a recording and reading layer group 14 in the first optical recording medium 10. The second optical system 200 is used for tracking control using a first servo layer 18 or a second servo layer 19 (described later) when information is recorded on the recording and reading layer group 14 using the first optical system 100.

A diverging beam 170 emitted from a light source 101 of the first optical system 100 and having a relatively short blue wavelength (380 to 450 nm, 405 nm in this optical pickup) passes through a collimating lens 153 provided with spherical aberration correction means 193 and through a wavelength selection filter 260 of the second optical system 200 and enters a polarizing beam splitter 152. The beam 170 entering the polarizing beam splitter 152 passes therethrough and then through a ¼ wavelength plate 154 and is thereby converted to a circularly polarized beam. The circularly polarized beam is then converted to a converging beam through an objective lens 156. The resultant beam 170 is focused on one of a plurality of recording and reading layers in the recording and reading layer group 14 formed in the first optical recording medium 10.

The aperture of the objective lens 156 is restricted by an aperture stop 155 to set the numerical aperture NA to 0.70 to 0.90 (0.85 in this optical pickup). The beam 170 reflected from, for example, the recording and reading layer group 14 passes through the objective lens 156 and then through the ¼ wavelength plate 154 and is thereby converted to a linearly polarized beam with the polarization plane rotated 90° relative to that in the outward path. Then, the resultant beam is reflected from the polarizing beam splitter 152. The polarizing beam splitter 152 has wavelength selectivity. More specifically, the polarizing beam splitter 152 allows the beam 170 from the light source 101 of the first optical system 100 to be reflected therefrom but always transmits a beam 270 (described later) emitted from the second optical system 200 and having a relatively long red wavelength.

The beam 170 reflected from the polarizing beam splitter 152 passes through a condensing lens 159 and is thereby converted to a converging beam. The converging beam passes through a cylindrical lens 157 and is incident on a photodetector 132. When the beam 170 passes through the cylindrical lens 157, astigmatism is given to the beam 170.

The photodetector 132 has four light receiving units (not shown), and each of the light receiving units outputs a current signal according to the amount of light received. The current signals are used to generate a focus error (hereinafter abbreviated as FE) signal using the astigmatic method, a tracking error (hereinafter abbreviated as TE) signal using the push-pull method (the TE signal is generated only during reading), a reading signal of information recorded on the first optical recording medium 10, and other signals. The FE and TE signals are amplified to desired levels, subjected to phase compensation, and then supplied to actuators 191 and 192 as feedback to perform focus control and tracking control. The tracking control by the first optical system 100 is used only for reading.

The diverging beam 270 emitted from a light source 201 of the second optical system 200 and having a wavelength of 630 to 680 nm (650 nm in this optical pickup) passes through a collimating lens 253 provided with spherical aberration correction means 293 and enters a polarizing beam splitter 252. The beam 270 entering the polarizing beam splitter 252 passes therethrough and then through a ¼ wavelength plate 254 for the second optical system and is thereby converted to a circularly polarized beam. The circularly polarized beam is reflected from the wavelength selection filter 260 and passes through the polarizing beam splitter 152, which is shared with the first optical system 100. The beam 270 is then converted to a converging beam through the objective lens 156. The resultant beam 270 is focused on the first servo layer 18 or the second servo layer 19 formed in the first optical recording medium 10. The beam 270 reflected from the first servo layer 18 or the second servo layer 19 passes through the objective lens 156 and then through the polarizing beam splitter 152 and is reflected from the wavelength selection filter 260 of the second optical system 200. The reflected beam 270 passes through the ¼ wavelength plate 254 and is thereby converted to a linearly polarized beam with the polarization plane rotated 90° relative to that in the outward path. Then, the resultant beam is reflected from the polarizing beam splitter 252. The beam 270 reflected from the polarizing beam splitter 252 passes through a condensing lens 259 and is thereby converted to a converging beam. The converging beam passes through a cylindrical lens 257 and is then incident on a photodetector 232. When the beam 270 passes through the cylindrical lens 257, astigmatism is given to the beam 270.

The photodetector 232 has four light receiving units (not shown), and each of the light receiving units outputs a current signal according to the amount of light received. The current signals are used to generate a focus error (FE) signal using the astigmatic method and a tracking error (TE) signal using the push-pull method. If information is recorded also on the first servo layer 18, a reading signal is also generated.

When information is recorded on the recording and reading layer group 14 using the first optical system 100, the TE signal from the second optical system 200 is amplified to a desired level, subjected to phase compensation, and then supplied to the actuators 191 and 192 as feedback to perform tracking control. Therefore, the first optical system 100 records information on the recording and reading layer group 14 under the tracking control by the second optical system 200. In the present embodiment, when information recorded on the recording and reading layer group 14 is read, the first optical system 100 itself performs tracking control using recording marks on the recording and reading layer group 14. Of course, the information can be read under tracking control by the second optical system 200.

Figure 2:
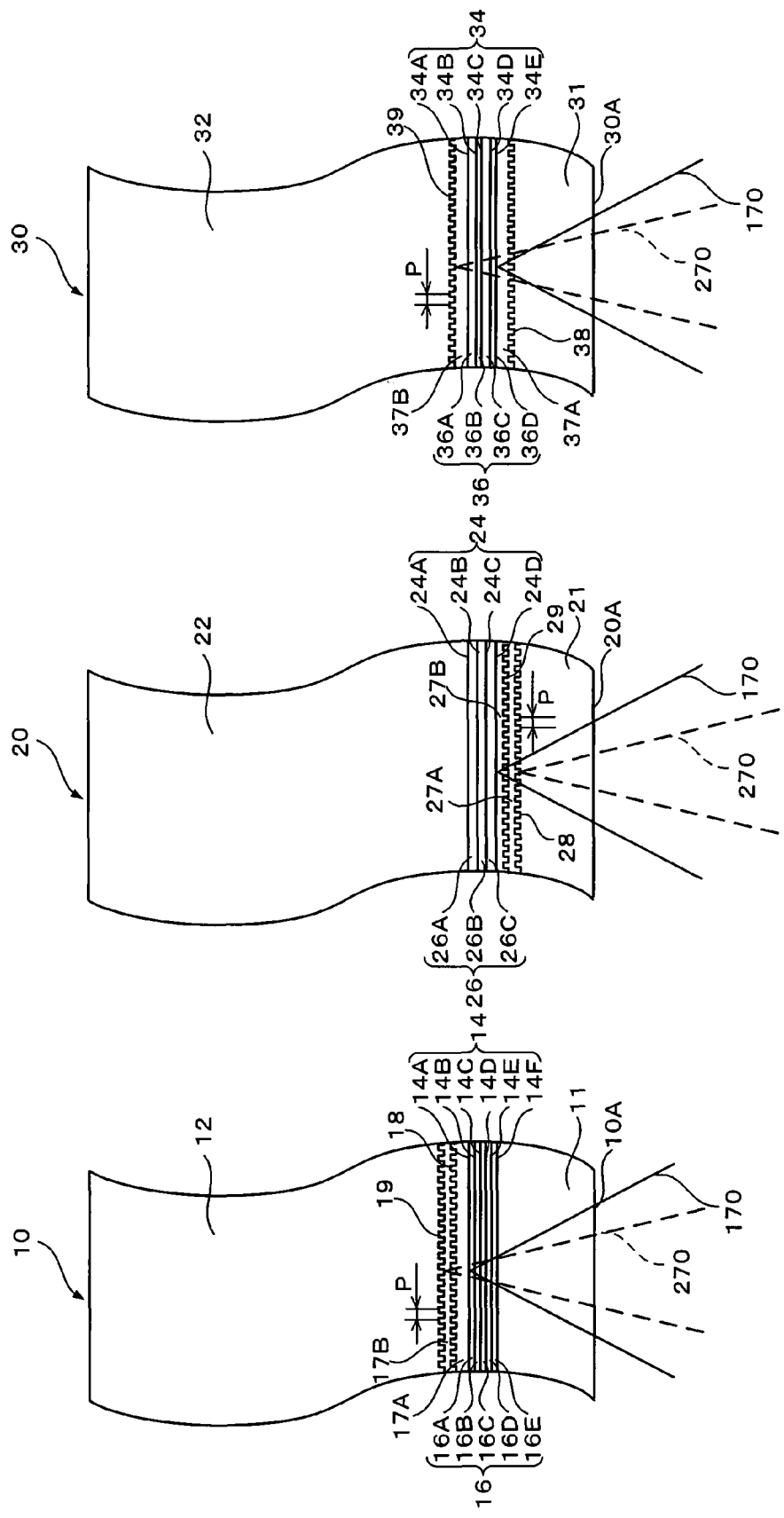
FIG. 2 is a set of cross-sectional views illustrating the stacking structures of optical recording mediums.
Figure 3:
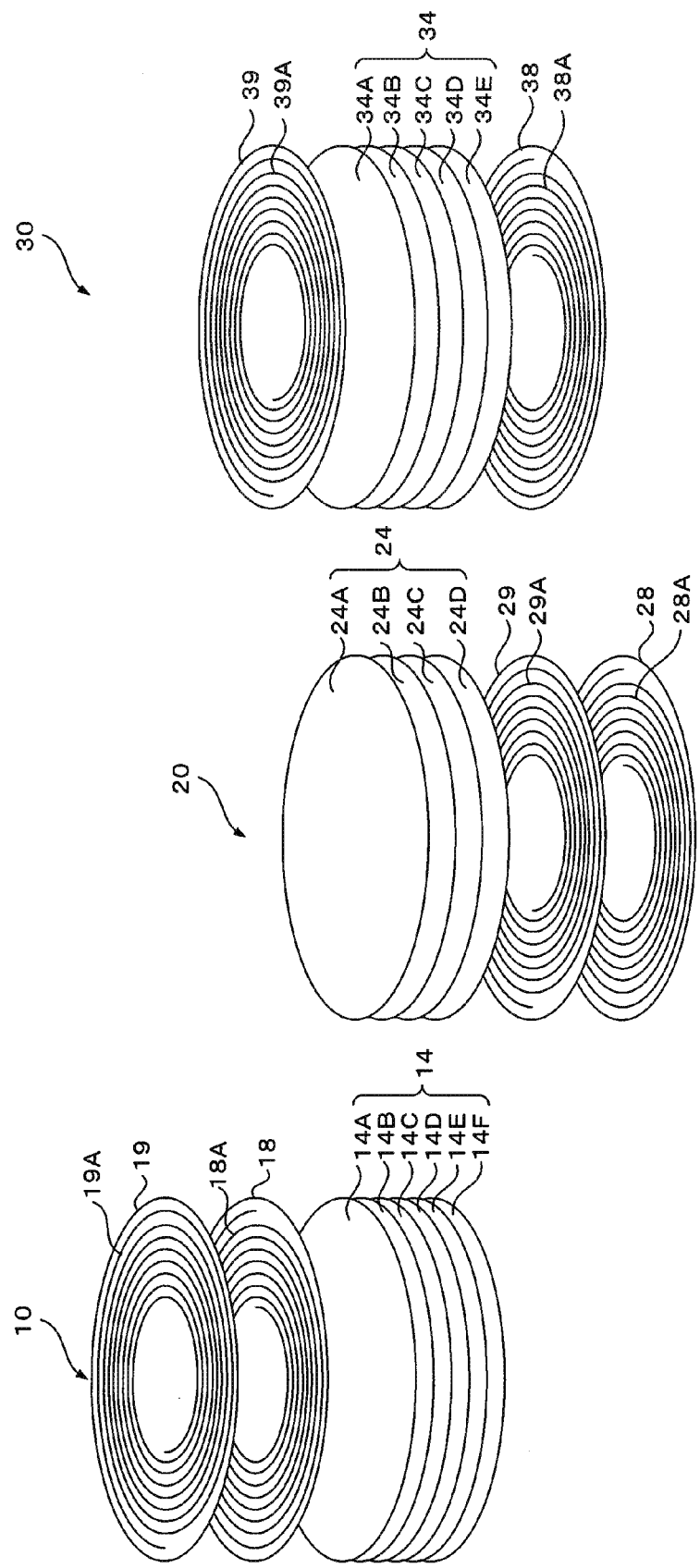
FIG. 3 is a set of perspective views illustrating the stacking structures of the optical recording mediums.

FIGS. 2 and 3 show the enlarged cross-sectional structures of first to third optical recording media 10, 20, and 30 of three types according to the present embodiment. The first optical recording medium 10 will be described in detail. However, the description of the second and third optical recording media 20 and 30 will be given, focusing on the differences from the first optical recording medium 10. Similar components in the first to third optical recording media 10, 20, and 30 are denoted by reference numerals with the same last digit.

The first optical recording medium 10 has a disc shape having an outer diameter of approximately 120 mm and a thickness of approximately 1.2 mm. The first optical recording medium 10 includes, in order from a light incident surface 10A, a cover layer 11, the recording and reading layer group 14, an intermediate layer group 16, a first spacer layer 17A, the first servo layer 18, a second spacer layer 17B, the second servo layer 19, and a support substrate 12.

In this embodiment, the recording and reading layer group 14 includes first to sixth recording and reading layers 14A to 14F, and information can be recorded on each recording and reading layer. Each of the first to sixth recording and reading layers 14A to 14E' has a flat structure with no projection and depression for tracking control. When any of the first to sixth recording and reading layers 14A to 14F is irradiated with the high-energy recording beam 170 emitted from the first optical system 100, recording marks are formed. The types of the recording and reading layers in the recording and reading layer group 14 include a write-once type in which information can be additionally written but the written information is not rewritable and a rewritable type in which information is rewritable.

The support substrate 12 is a disc-shaped substrate having a diameter of 120 mm and a thickness of 1.0 mm, which is employed to ensure the thickness required for the optical recording medium (about 1.2 mm). The second servo layer 19 is formed on a surface of the support substrate 12 that is on the side toward the light incident surface 10A. More specifically, a spiral groove and a spiral land are formed on the support substrate 12 on the side toward the light incident surface 10A so as to extend from the vicinity of its center toward its outer edge in a second spiral direction (the clockwise direction in FIG. 3). The land and groove serve as a projection and a depression (recess) for tracking control, and the beam 270 from the second optical system 200 is guided by the groove and land.

Various materials can be used as the material for the support substrate 12. For example, glass, ceramic, and resin can be used. It is preferable to use a resin because of its good moldability. Example of the resin include polycarbonate resins, olefin resins, acrylic resins, epoxy resins, polystyrene resins, polyethylene resins, polypropylene resins, silicone resins, fluorine-based resins, ABS resins, and urethane resins. Of these, polycarbonate resins and olefin resins are particularly preferred because of their processability. The support substrate 12 does not serve as an optical path of the beam 270 and therefore need not have high light transmittance.

The second servo layer 19 on the support substrate 12 is formed by forming a reflective layer on the surface of the support substrate 12. Therefore, the second servo layer 19 includes the reflective layer and the projection and depression (the groove and land) 19A for tracking control that extend in the second spiral direction (the clockwise direction in FIG. 3) (see FIG. 3). The second servo layer 19 may be formed as a layer of a metal such as Ag so as to function as a light reflecting film. If necessary, a reflective recordable layer may be provided.

The second spacer layer 17B is formed on the second servo layer 19. The second spacer layer 17B is formed of a light-transmitting ultraviolet curable acrylic resin, and the thickness thereof is set to 45 μm in this embodiment. A spiral groove and a spiral land are formed on a surface of the second spacer layer 17B that is on the side toward the light incident surface 10A. The spiral land and groove extend from the vicinity of the center of the second spacer layer 17B toward its outer edge in a first spiral direction (the counterclockwise direction in FIG. 3). These land and groove serve as a projection and a depression (recess) for the first servo layer 18 used for tracking control, and the beam 270 from the second optical system 200 is guided by the land and groove.

The first servo layer 18 is formed by forming a reflective layer on the surface of the second spacer layer 17B. Therefore, the first servo layer 18 includes the reflective layer and the projection and depression (the land and groove) 18A for tracking control that extend in the first spiral direction (the counterclockwise direction in FIG. 3). The first servo layer 18 may be formed as a layer of a metal such as Ag so as to function as a light reflecting film. If necessary, a reflective recordable layer may be provided. The first spiral direction of the projection and depression 18A of the first servo layer 18 is opposite to the second spiral direction of the projection and depression 19A of the second servo layer 19.

In this embodiment, the track pitch P of the projections and depressions 18A and 19A for tracking control in the first and second servo layers 18 and 19 is set to a value twice the track pitch of recording marks to be formed on the recording and reading layers 14A to 14F. More specifically, the track pitch of the recording marks to be formed on the recording and reading layers 14A to 14F is about 0.32 µm to support the BD standard. Therefore, the track pitch P of the grooves and lands of the first and second servo layers 18 and 19 is set to about 0.64 µm. When the track pitch P is about 0.64 µm, sufficient tracking can be achieved even with the beam 270 having a relatively long wavelength in the red wavelength range. In particular, in the present embodiment, tracking is performed using both the groove and land. Therefore, although the pitch of the projections and depressions 18A and 19A is about 0.64 µm, the track pitch of recording marks recorded on the recording and reading layers 14A to 14F can be about 0.32 µm, which is one half of the pitch of the projections and depressions 18A and 19A. Since the track pitch of the recording marks on the recording and reading layer group 14 can be halved without reducing the track pitch of the first and second servo layers 18 and 19, the recording capacity can be increased.

The first spacer layer 17A is formed on the first servo layer 18. The first spacer layer 17A is formed of a light-transmitting ultraviolet curable acrylic resin, and the thickness thereof is set to 45 µm in this embodiment.

Each of the first to sixth recording and reading layers 14A to 14E' stacked on the first spacer layer 17A on the side toward the light incident surface 10A has a three-film structure (not shown) having dielectric films stacked on opposite sides of a write once-type recording film. Each of the first to sixth recording and reading layers 14A to 14F has light reflectance, absorbance, transmittance, and other properties optimized for the beam 170 in the blue wavelength range (short wavelength range) from the first optical system 100 and has wavelength selectivity that allows sufficient transmission of the beam 270 in the red wavelength range (long wavelength range) from the second optical system 200. More specifically, each of the first to sixth recording and reading layers 14A to 14F is formed to have a transmittance that allows the beam 270 in the red wavelength range (long wavelength range) to track the first and second servo layers 18 and 19. In addition, the light reflectance, absorbance, and transmittance of each of the first to sixth recording and reading layers 14A to 14F are set to values that allow recording and reading to be achieved with the beam 170 in the blue wavelength range (short wavelength range).

The dielectric films in each recording and reading layer have a basic function of protecting the write once type recording film and also play a role in increasing the differences in optical properties before and after the formation of recording marks.

When the beam 170 is applied, the recording sensitivity is likely to decrease if the energy absorbed by the dielectric films is large. To prevent the reduction in the recording sensitivity, it is preferable to select a material having a low absorption coefficient (k) for the wavelength range of 380 nm to 450 nm (particularly at 405 nm) as the material for the dielectric films. In this embodiment, $TiO_2$ is used as the material for the dielectric films.

The write once type recording film sandwiched between the dielectric films is used to form irreversible recording marks, and the regions in which the recording marks have been formed have a reflectance for the beam 170 significantly different from that of the other regions (blank regions). The recording and reading of data are thereby achieved. Also the write once type recording film has high transmittance for the tracking beam 270 in the red wavelength range from the second optical system 200.

The write once type recording film is formed mainly of a material containing Bi and O. The write once type recording film functions as an inorganic reactive film, and its reflectance is largely changed chemically or physically by the heat of a laser beam. Preferred examples of the material for the write once type recording film include materials containing Bi and O as main components and materials containing Bi, M, and O as main components (wherein M is at least one element selected from among Mg, Ca, Y, Dy, Ce, Tb, Ti, Zr, V, Nb, Ta, Mo, W, Mn, Fe, Zn, Al, In, Si, Ge, Sn, Sb, Li, Na, K, Sr, Ba, Sc, La, Nd, Sm, Gd, Ho, Cr, Co, Ni, Cu, Ga, and Pb). In the present embodiment, Bi—Ge—O is used as the material for the write once type recording film.

In the above description, the write once type recording film is used for each of the first to sixth recording and reading layers 14A to 14F. However, a phase change recording film that allows repeated recording can be used. In such a case, it is preferable to use SbTeGe as the main components of the phase change recording film.

The intermediate layer group 16 includes first to fifth intermediate layers 16A to 16E that are stacked in that order from the side away from the light incident surface 10A and disposed between the first to sixth recording and reading layers 14A to 14F. Each of the intermediate layers 16A to 16E is formed of an ultraviolet curable acrylic or epoxy resin. The thicknesses of the intermediate layers 16A to 16E are 16 µm for the first intermediate layer 16A, 12 µm for the second intermediate layer 16B, 16 µm for the third intermediate layer 16C, 12 µm of the fourth intermediate layer 16D, and 16 µm for the fifth intermediate later 16E. More specifically, two types of intermediate layers having different thicknesses (16 µm and 12 µm) are stacked alternately. Therefore, the interlayer distances between adjacent ones of the first to sixth recording and reading layers 14A to 14F are set alternately to a first distance (16 µm) and a second distance (12 µm) different from the first distance in sequence from the light incident surface side. The difference between the first and second distances is set to 4 µm. In this manner, interlayer crosstalk is reduced.

As in the intermediate layer group 16, the cover layer 11 is formed of a light-transmitting ultraviolet curable acrylic resin, and the thickness thereof is set to 38 µm.

Since the first optical recording medium 10 is configured as described above, the second servo layer 19 is positioned at a distance of 0.2 mm (200 µm) from the light incident surface 10A, and the first servo layer 18 is positioned at a distance of 0.155 mm (155 µm) from the light incident surface 10A. In the recording and reading layer group 14, the first recording and reading layer 14A, which is farthest from the light incident surface 10A, is positioned at a distance of 0.11 mm (110 µm) from the light incident surface 10A, and the sixth recording and reading layer 14F, which is closest to the light incident surface 10A, is positioned at a distance of 38 µm from the light incident surface 10A. The total thickness of the recording and reading layer group 14 (the distance from the first recording and reading layer 14A to the sixth recording and reading layer 14F) is 72 µm.

Next, a description will be given of the second optical recording medium 20. In the second optical recording medium 20, first and second servo layers 28 and 29 are disposed closer to a light incident surface 20A than a recording and reading layer group 24. Therefore, a first spacer layer 27A and a second spacer layer 27B are also disposed closer to the light incident surface 20A than the recording and reading layer group 24. The recording and reading layer group 24 has a four-layer structure (including first to fourth recording and reading layers 24A to 24D), and first to third intermediate layers 26A to 26C are inserted between the first to fourth recording and reading layers 24A to 24D. The other configuration is the same as that of the first optical recording medium 10.

More specifically, the thickness of a support substrate 22 is set to 1.1 mm, and its surface close to the light incident surface 20A is flat. The flat recording and reading layer group 24 and a flat intermediate layer group 26 are stacked on that surface in an alternating manner. The thicknesses of the first to third intermediate layers 26A to 26C are 26 μm for the first intermediate layer 26A, 20 μm for the second intermediate layer 26B, and 26 μm for the third intermediate layer 26C. Therefore, the interlayer distances between adjacent ones of the first to third recording and reading layers 24A to 24D are set alternately to a first distance (26 μm) and a second distance (20 μm) different from the first distance in sequence from the light incident surface side. The difference between the first and second distances is set to 6 μm.

The second spacer layer 27B is stacked on the fourth recording and reading layer 24D on the side toward the light incident surface 20A. The second spacer layer 27B is formed of a light-transmitting ultraviolet curable acrylic resin, and the thickness thereof is set to 10 μm in this embodiment. A spiral groove and a spiral land are formed, using a stamper, on a surface of the second spacer layer 27B that is on the side toward the light incident surface 20A. The spiral groove and land extend from the vicinity of the center of the second spacer layer 27B toward its outer edge in a second spiral direction (the clockwise direction in FIG. 3). These land and groove serve as a projection and a depression (recess) for the second servo layer 29 used for tracking control, and the beam 270 from the second optical system 200 is guided by the land and groove.

The second servo layer 29 is formed by forming a reflective layer on the surface of the second spacer layer 27B. Therefore, the second servo layer 29 includes the reflective layer and the projection and depression (the land and groove) 29A for tracking control that extend in the second spiral direction (see FIG. 3).

The first spacer layer 27A is formed on the second servo layer 29. In this embodiment, the thickness of the first spacer layer 27A is set to 10 μm. A spiral land and a spiral groove are formed on a surface of the first spacer layer 27A that is on the side toward the light incident surface 20A. The spiral land and groove extend from the vicinity of the center of the first spacer layer 27A toward its outer edge in a first spiral direction (the counterclockwise direction in FIG. 3). These land and groove serve as a projection and a depression (recess) for the first servo layer 28 used for tracking control, and the beam 270 from the second optical system 200 is guided by the land and groove.

The first servo layer 28 is formed by forming a reflective layer on the surface of the first spacer layer 27A. Therefore, the first servo layer 28 includes the reflective layer and the projection and depression (the land and groove) 28A for tracking control that extend in the first spiral direction (the counterclockwise direction in FIG. 3). The first spiral direction of the projection and depression 28A of the first servo layer 28 is opposite to the second spiral direction of the projection and depression 29A of the second servo layer 29.

A cover layer 21 having a thickness of 18 μm is formed on the surface of the first servo layer 28.

In the second optical recording medium 20, the first servo layer 28 is positioned at a distance of 18 μm from the light incident surface 20A, and the second servo layer 29 is positioned at a distance of 28 μm from the light incident surface 20A. In the recording and reading layer group 24, the first recording and reading layer 24A, which is farthest from the light incident surface 20A, is positioned at a distance of 0.11 mm from the light incident surface 20A, and the fourth recording and reading layer 24D, which is closest to the light incident surface 20A, is positioned at a distance of 38 μm from the light incident surface 20A. The total thickness of the recording and reading layer group 24 (the distance from the first recording and reading layer 24A to the fourth recording and reading layer 24D) is 72 μm.

In the second optical recording medium 20, the beam 270 from the second optical system 200 does not enter the recording and reading layer group 24 and the intermediate layer group 26. Therefore, the recording and reading layer group 24 and the intermediate layer group 26 need not have wavelength selectivity. Preferably, the first servo layer 28 and the second servo layer 29 have wavelength selectivity that allows these layers to efficiently reflect the long-wavelength beam 270 from the second optical system 200 and also allows efficient transmission of the short-wavelength beam 170 from the first optical system 100. More specifically, the first servo layer 28 and the second servo layer 29 are formed to have a reflectance that allows the beam 270 in the red wavelength range (long wavelength range) to track these layers. In addition, the first servo layer 28 and the second servo layer 29 are formed to have a transmittance that allows recording on and reading from the recording and reading layer group 24 to be achieved with the beam 170 in the blue wavelength range (short wavelength range).

Next, a description will be given of the third optical recording medium 30. In the third optical recording medium 30, a second servo layer 39 is disposed farther from a light incident surface 30A than a recording and reading layer group 34, and a first servo layer 38 is disposed closer to the light incident surface 30A than the recording and reading layer group 34. Therefore, a second spacer layer 37B is disposed farther from the light incident surface 30A than the recording and reading layer group 34, and a first spacer layer 37A is disposed closer to the light incident surface 30A than the recording and reading layer group 34. The recording and reading layer group 34 has a five-layer structure (including first to fifth recording and reading layers 34A to 34E), and first to fourth intermediate layers 36A to 36D are inserted between the first to fifth recording and reading layers 34A to 34E. The other configuration is the same as that of the first optical recording medium 10.

More specifically, a support substrate 32 has a thickness of 1.155 mm, and a spiral groove and a spiral land are formed on the support substrate 32 so as to extend from the vicinity of its center toward its outer edge in a second spiral direction (the clockwise direction in FIG. 3). The second servo layer 39 is formed on a surface of the support substrate 32 that is on the side toward the light incident surface 30A.

The second servo layer 39 is formed by forming a reflective layer on the surface of the support substrate 32. Therefore, the second servo layer 39 includes the reflective layer and the projection and depression (the land and groove) 39A for tracking control that extend in the second spiral direction (the clockwise direction in FIG. 3) (see FIG. 3).

The second spacer layer 37B is formed on the second servo layer 39. The second spacer layer 37B is formed of a light-transmitting ultraviolet curable acrylic resin into a flat shape, and the thickness thereof is set to 45 μm in this embodiment.

The recording and reading layer group 34 and an intermediate layer group 36 are alternately stacked on a surface of the second spacer layer 37B that is on the side toward the light incident surface 30A.

The thicknesses of the first to fourth intermediate layers 36A to 36D are 20 μm for the first intermediate layer 36A, 16 μm for the second intermediate layer 36B, 20 μm for the third intermediate layer 36C, and 16 μm for the fourth intermediate layer 36D. Therefore, the interlayer distances between adjacent ones of the first to fifth recording and reading layers 34A to 34E are set alternately to a first distance (16 μm) and a second distance (20 μm) different from the first distance in sequence from the light incident surface side. The difference between the first and second distances is set to 4 μm.

The first spacer layer 37A is stacked on the fifth recording and reading layer 34E on the side toward the light incident surface 30A. In this embodiment, the thickness of the first spacer layer 37A is set to 10 μm. A spiral groove and a spiral land are formed, using a stamper, on a surface of the first spacer layer 37A that is on the side toward the light incident surface 30A. The spiral groove and land extend from the vicinity of the center of the first spacer layer 37A toward its outer edge in a first spiral direction (the counterclockwise direction in FIG. 3). These land and groove serve as a projection and a depression (recess) for the first servo layer 38 used for tracking control, and the beam 270 from the second optical system 200 is guided by the land and groove.

The first servo layer 38 is formed by forming a reflective layer on the surface of the first spacer layer 37A. Therefore, the first servo layer 38 includes the reflective layer and the projection and depression (the land and groove) 38A for tracking control that extend in the first spiral direction (the counterclockwise direction in FIG. 3). The first spiral direction of the projection and depression 38A of the first servo layer 38 is opposite to the second spiral direction of the projection and depression 39A of the second servo layer 39.

A cover layer 31 having a thickness of 28 μm is formed on the surface of the first servo layer 38.

In the third optical recording medium 30, the second servo layer 39 is positioned at a distance of 0.155 mm (155 μm) from the light incident surface 30A, and the first servo layer 38 is positioned at a distance of 28 μm from the light incident surface 30A. The recording and reading layer group 34 is stacked between the first servo layer 38 and the second servo layer 39. In the recording and reading layer group 34, the first recording and reading layer 39A, which is farthest from the light incident surface 30A, is positioned at a distance of 0.11 mm from the light incident surface 30A, and the fifth recording and reading layer 34D, which is closest to the light incident surface 30A, is positioned at a distance of 38 μm from the light incident surface 30A. The total thickness of the recording and reading layer group 34 (the distance from the first recording and reading layer 34A to the fifth recording and reading layer 34E) is 72 μm. Preferably, the first servo layer 38 has wavelength selectivity that allows it to efficiently reflect the long-wavelength beam 270 from the second optical system 200 and allows efficient transmission of the short-wavelength beam 170 from the first optical system 100.

More specifically, the first servo layer 38 is formed to have a reflectance that allows the beam 270 in the red wavelength range (long wavelength range) to track the first servo layer 38. In addition, the first servo layer 38 is formed to have a transmittance that allows recording on and reading from the recording and reading layer group 34 to be achieved with the beam 170 in the blue wavelength range (short wavelength range). The recording and reading layer group 34 is formed to have a transmittance that allows the beam 270 in the red wavelength range (long wavelength range) to track the second servo layer 39. In addition, the recording and reading layer group 34 is formed to have light reflectance, absorbance, and transmittance that allow recording and reading to be achieved with the beam 170 in the blue wavelength range (short wavelength range).

A method of manufacturing each of the first to third optical recording media 10, 20, and 30 will next be described. However, only the method of manufacturing the first optical recording medium 10 will be described, and the description of the methods of manufacturing the second and third optical recording media 20 and 30 is omitted.

First, a support substrate 12 having a groove and land formed thereon is produced by injection molding of a polycarbonate resin and using a metal stamper. The method of producing the support substrate 12 is not limited to injection molding, and any other method such as a 2P method may be used.

Next, the second servo layer 19 is formed on the surface of the support substrate 12 on which the groove and land have been formed. The second servo layer 19 is formed by forming a reflective metal layer by sputtering using an Ag alloy. Then the second spacer layer 17B is formed on the second servo layer 19. To form the second spacer layer 17B, for example, a coating of an ultraviolet curable acrylic or epoxy resin having a controlled viscosity is formed by, for example, spin coating and then irradiated with ultraviolet rays to cure the resin with a stamper with a projection and a depression for tracking pressed against the coating. After curing, the stamper is removed, and the formation of the second spacer layer 17B is completed.

Next, the first servo layer 18 is formed. The first servo layer 18 is formed by forming a reflective metal layer by sputtering using an Ag alloy. Then the first spacer layer 17A is formed on the first servo layer 18. To form the first spacer layer 17A, for example, a coating of an ultraviolet curable acrylic or epoxy resin having a controlled viscosity is formed by, for example, spin coating and then irradiated with ultraviolet rays to cure the resin without using any stamper, and therefore the first spacer layer 17A is formed to be flat.

Next, the first recording and reading layer 14A is formed. More specifically, a dielectric film, a write once type recording film, and another dielectric film are formed in that order by vapor deposition. In particular, sputtering is preferably used. Next, the first intermediate layer 16A is formed on the first recording and reading layer 14A. To form the first intermediate layer 16A, for example, a coating of an ultraviolet curable resin having a controlled viscosity is formed by, for example, spin coating and then irradiated with ultraviolet rays to cure the resin. The above procedure is repeated to sequentially stack the second recording and reading layer 14B, the second intermediate layer 16B, and so on.

After completion of the formation of the sixth recording and reading layer, the cover layer 11 is formed thereon, and the first optical recording medium 10 is thereby completed. To form the cover layer 11, for example, a coating of an ultraviolet curable acrylic or epoxy resin having a controlled viscosity is formed by, for example, spin coating and then irradiated with ultraviolet rays to cure the resin. In the present embodiment, the manufacturing method described above is used. However, the present invention is not limited to the manufacturing method described above, and other manufacturing techniques may be used.

Next, a description will be given of a procedure of recording and reading information on/from the first optical recording medium 10 using the optical pickup 90.

To record information on the first recording and reading layer 14A of the first optical recording medium 10, first, the second servo layer 19 is irradiated with the beam 270 in the red wavelength range from the second optical system 200 to perform tracking in the second spiral direction. Simultaneously with the above operation, the first recording and reading layer 14A is irradiated with the recording beam 170 in the blue wavelength range from the first optical system 100. The basic specifications of this optical recording medium series and the information about the number of stacked layers in the information recording and reading layer group 14 have been recorded as recorded pits or in a BCA (burst cutting area) on the second servo layer 19 and are read each time tracking control is started. In the present embodiment, the basic information of the optical recording medium includes the positions of the servo layers, the position of the recording and reading layer that is closest to the light incident surface, the position of the recording and reading layer that is farthest from the light incident surface, and the rule of the interlayer distances in the recording and reading layer group. By reading the basic specifications of the optical recording medium so that the optical pickup 90 can be adapted to the basic specifications, the beams 170 and 270 can be quickly focused on the first and second servo layers 18 and 19 and the first recording and reading layer 14A.

Then while tracking is performed using the second servo layer 19, information is recorded on the first recording and reading layer 14A. The direction of recording is the second spiral direction. After completion of recording, additional information (for example, address information of recording and content information) is recorded on the first servo layer 18 and/or the second servo layer 19 to complete the process. If the first and second servo layers 18 and 19 have no recording layers, it is preferable that the additional information be recorded on the first recording and reading layer 14A that is farthest from the light incident surface 10A or the sixth recording and reading layer 14F that is closest to the light incident surface 10A to complete the process.

After information has been recorded on the entire region of the first recording and reading layer 14A, recording is then performed on the second recording and reading layer 14B adjacent thereto. In this case, the focus of the beam 270 in the red wavelength range from the second optical system 200 is moved from the second servo layer 19 to the first servo layer 18, and tracking is performed in the first spiral direction. Since the distance between the first servo layer 18 and the second servo layer 19 is very small, the focus can be moved quickly.

Upon switching between the servo layers, the focus of the beam 170 from the first optical system 100 is moved from the first recording and reading layer 14A to the second recording and reading layer 14B. Then while tracking is performed using the first servo layer 18, information is recorded on the second recording and reading layer 14B. The direction of recording is the first spiral direction that is opposite to the recording direction on the first recording and reading layer 14A. Therefore, the end position of recording on the first recording and reading layer 14A and the start position of recording on the second recording and reading layer 14B are radially outermost or innermost. Therefore, to change the focus, the beam 170 from the first optical system 100 is simply moved in the direction of focusing, so that the focus can be sequentially and quickly moved between the recording and reading layers. After completion of recording on the second recording and reading layer 14B, additional information (for example, address information of recording and content information) is recorded on the first servo layer 18 and/or the second servo layer 19 to complete the process.

When the target recording layer is changed from the second recording and reading layer 14B to the third recording and reading layer 14C, tracking is again performed using the second servo layer 19, and recording is performed in the second spiral direction. The above process is repeated until information is recorded on the sixth recording and reading layer 14F.

To read the information recorded on, for example, the second recording and reading layer 14B, first, the beam 270 from the second optical system 200 is used to read the basic information described above and the additional information of recording (for example, the information of the contents recorded on the second recording and reading layer 14B) from the first servo layer 18 or the second servo layer 19. Next, on the basis of the read information, the beam 170 from the first optical system 100 is used to access a predetermined address in the second recording and reading layer 14B to perform reading. Since it is apparent that information has already been recorded on the second recording and reading layer 14B, tracking can be performed using the recording marks for the information. Therefore, when the contents on the second recording and reading layer 14B are being read, the beam 270 from the second optical system 200 is not needed. Even when information has been recorded continuously on the second recording and reading layer 14B and the third recording and reading layer 14C, the target recording and reading layer can be changed without interrupting the reading of the information, because the information has been recorded sequentially as described above.

Information is recorded on the second recording medium 20 shown in FIG. 2 in a similar manner. For example, when recording is performed on an odd-numbered recording layer (the first or third recording and reading layer 24A or 24C), tracking is performed in the second spiral direction using the second servo layer 29. When recording is performed on an even-numbered recording and reading layer (the second or fourth recording and reading layer 24B or 24D), tracking is performed in the first spiral direction using the first servo layer 28.

Information is recorded on the third recording medium 30 in a similar manner. For example, when recording is performed on an odd-numbered recording layer (the first, third, or fifth recording and reading layer 34A, 34C, or 34E), tracking is performed in the second spiral direction using the second servo layer 39. When recording is performed on an even-numbered recording and reading layer (the second or fourth recording and reading layer 34B or 34D), tracking is performed in the first spiral direction using the first servo layer 38. In this manner, recording and reading can be performed sequentially on adjacent recording and reading layers.

Each of the first to third optical recording media 10, 20, and 30 in the present embodiments described above includes, as dedicated tracking layers, a first servo layer and a second servo layer that are different in spiral direction. By using these servo layers alternately, continuous recording and reading can be performed on the recording and reading layer group. Therefore, even when a multi-layer recording and reading layer group is used, particularly, when three or more recording and reading layers are used, recording and reading can be performed without interruption even during switching between the recording and reading layers.

In the first to third optical recording media 10, 20, and 30, a target recording and reading layer can be specified by detecting the spiral direction for the information recorded on the recording and reading layer group. Therefore, preferably, whether or not the target recording and reading layer is a correct layer is confirmed in advance using the spiral direction of the recorded information.

In the first and second optical recording media 10 and 20, the first and second servo layers are disposed adjacent to each other, so that it is not necessary to increase the range of spherical aberration correction for the second optical system 200. Therefore, tracking control can be performed both in the first and second spiral directions with high accuracy without using a complicated second optical system 200.

In the first optical recording medium 10, the first and second servo layers 18 and 19 are disposed deeper than the recording and reading layer group 14, i.e., closer to the support substrate 12. Therefore, these servo layers can be efficiently formed by, for example, injection molding, and the yield can thereby be improved, so that the manufacturing cost can be further reduced. In particular, in the present embodiment, the recording and reading layer group 14 and the intermediate layer group 16 have properties that allow them to reflect short-wavelength light and allow transmission of long-wavelength light. Therefore, by using a long wavelength such as a red wavelength for the second optical system 200, a reduction in accuracy of tracking control can be suppressed even when the recording and reading layer group 14 is stacked on the front side. In addition, the beam 270 for tracking control does not adversely affect recording and reading on/from the recording and reading layer group 14.

In the second optical recording medium 20, the first and second servo layers 28 and 29 are disposed on the front side of the recording and reading layer group 24, i.e., on the side close to the cover layer 21. Therefore, the influence of the non-uniformity in thickness of the recording and reading layer group 24 is eliminated, and tracking control can thereby be performed with higher accuracy. In particular, in the second optical recording medium 20, the first and second servo layers 28 and 29 have wavelength selectivity. Therefore, by employing a long-wavelength beam such as a red beam as the beam 270 in the second optical system 200, the beam 270 can be prevented from entering the recording and reading layer group 24 and being reflected therefrom. This can improve the accuracy of tracking control and recording and reading. If the beam used in the first optical system 100 and the beam used in the second optical system 200 are in the same wavelength range, the first and second servo layers 28 and 29 are designed to have light reflective properties and also light transmitting properties, as in the recording and reading layer group 24. In such a case, the wavelength selectivity is not necessary.

With the optical recording reading method in each embodiment, when information is recorded on adjacent recording and reading layers, the information is recorded on one of the recording and reading layers in the first spiral direction using the first servo layer and recorded on the other recording and reading layer in the second spiral direction using the second servo layer. Therefore, the information can be continuously recorded on and read from the adjacent recording and reading layers, and recording and reading with less interruption can be achieved. In the present embodiments, recording is performed on the recording and reading layer group in order from the deepest layer on the side away from the light incident surface (the layer farthest from the light incident surface). Of course, information may be recorded in order from the layer closest to the light incident surface.

In the present embodiments, the track pitch of the tracking projections and depressions on the first and second servo layers is set to a value twice the track pitch of the recording and reading layer group used for recording. Therefore, a low-cost long-wavelength red beam 270 can be used for the servo layers. Since tracking is performed using both the land and groove, recording can be performed on the recording and reading layer group at a track pitch one-half that of the servo layers. In particular, by setting the track pitch of the servo layers to 0.64 µm, existing products for the DVD standard can be used as the second optical system 200 with almost no change. The track pitch of the recording and reading layers is 0.32 µm. Therefore, existing products for the BD standard can be used as the first optical system 100 with almost no change. No additional development expense is required for the optical pickup 90, and existing parts can be effectively used.

In each of the first to third optical recording media 10 to 30 according to the respective present embodiments, the first and second servo layers are provided on one of the sides of the support substrate 12, 22, or 32, but the present invention is not limited thereto.

Figure 4:
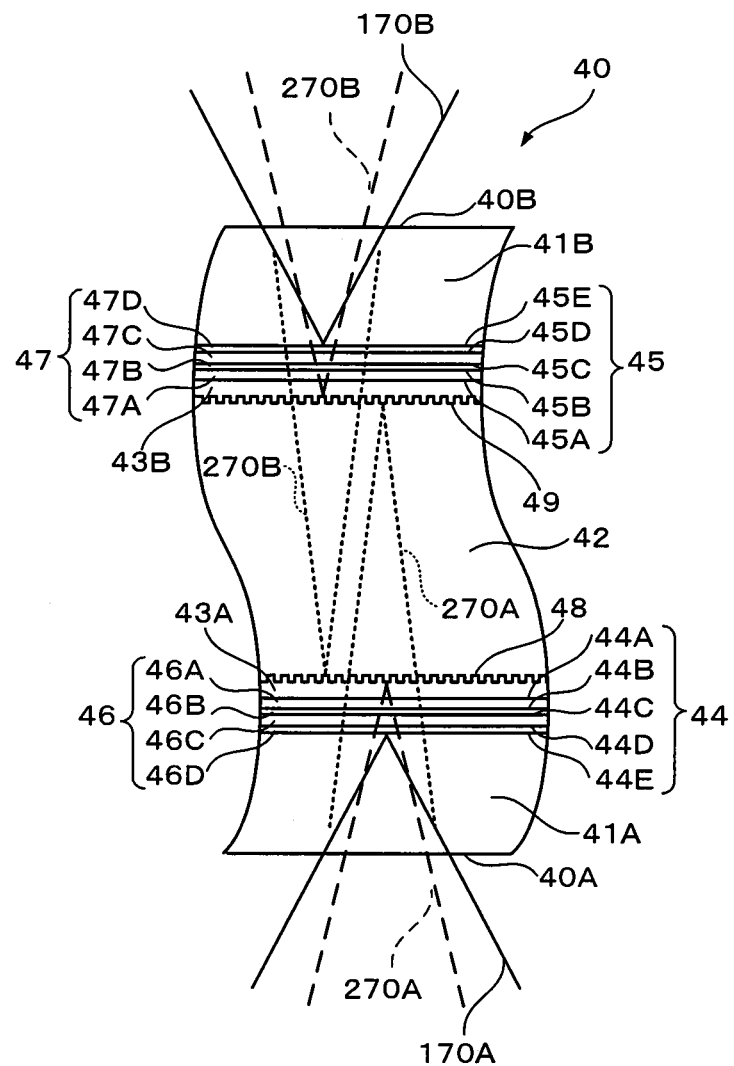
FIG. 4 is a cross-sectional view illustrating another example of the stacking structure of the optical recording medium.

For example, FIG. 4 illustrates a fourth optical recording medium 40, in which a first servo layer 48 may be disposed on one side of a support substrate 42 while a second servo layer 49 may be disposed on the other side of the support substrate 42. In this case, a spiral groove and a spiral land are formed on the surface of the one side of the support substrate 42 so that the spiral groove and land extend from the vicinity of the center of the support substrate 42 toward its outer edge in a first spiral direction. The first servo layer 48 is formed by forming a reflective layer on the surface thereof. Further, a spiral groove and a spiral land are formed on the surface of the other side of the support substrate 42 so that the spiral groove and land extend from the vicinity of the center of the support substrate 42 toward its outer edge in a second spiral direction that is opposite to the first spiral direction. The second servo layer 49 is formed by forming a reflective layer on that surface. As a result, the first servo layer 48 is located closer to the first light incident surface 40A while the second servo layer 49 is located closer to the second light incident surface 40B that is opposite to the first light incident surface 40A.

A first recording and reading layer group 44 is disposed on the one side of the support substrate 42 and closer to the first light incident surface 40A than the first servo layer 48 with a first spacer layer 43A interposed therebetween. A second recording and reading layer group 45 is disposed on the other side of the support substrate 42 and closer to the second light incident surface 40B than the second servo layer 49 with a second spacer layer 43B interposed therebetween. Intermediate layers constituting a first intermediate layer group 46 are disposed in between corresponding recording and reading layers constituting the first recording and reading layer group 44. Furthermore, intermediate layers constituting a second intermediate layer group 47 are disposed in between corresponding recording and reading layers constituting the second recording and reading layer group 45.

A first cover layer 41A is disposed on the surface of the first recording and reading layer group 44 that is on the side toward the first optical incident layer 40A. Further, a second cover layer 41B is disposed on the surface of the second recording and reading layer group 45 that is on the side toward the second optical incident layer 40B.

In this fourth optical recording medium 40, while tracking control is performed utilizing the first servo layer 48, information can be recorded or read on or from the respective recording and reading layers 44A to 44D of the first recording and reading layer group 44. Furthermore, while tracking control is performed utilizing the second servo layer 49, information can be recorded or read on or from the respective recording and reading layers 45A to 45D of the second recording and reading layer group 45. Specifically, the first servo layer 48 is irradiated with a first beam 270A in the red wavelength range (long wavelength range) from the first light incident surface 40A side, thereby achieving tracking control. Utilizing the tracking control, the first recording and reading layer group 44 is irradiated with another first beam 170A in the blue wavelength range (short wavelength range) from the first light incident surface 40A side, thereby achieving recording and reading. Furthermore, the second servo layer 49 is irradiated with a second beam 270B in the red wavelength range (long wavelength range) from the second light incident surface 40B side, thereby achieving tracking control. Utilizing the tracking control, the second recording and reading layer group 45 is irradiated with another second beam 170B in the blue wavelength range (short wavelength range) from the second light incident surface 40B side, thereby achieving recording and reading. Of course, the second servo layer 49 can be irradiated with the first beams 270A through the support substrate 42. Information can be recorded or read on or from the first recording and reading layer group 44 while tracking control is performed using the second servo layer 49. Furthermore, the first servo layer 48 can be irradiated with the second beams 270B through the support substrate 42. Information can be recorded or read on or from the second recording and reading layer group 45 while tracking control is performed using the first servo layer 48.

In the fourth optical recording media 40, as the servo layers 48 and 49 and the recording and reading layer groups 44 and 45 are disposed on both sides of the support substrate 42, respectively, the number of the stacked recording and reading layers can be increased. Internal stress generated during manufacturing can be dispersed over the entire sides of the support substrate 42, thereby suppressing the possible warp and deformation of the fourth optical recording and reading medium 40.

Figure 5:
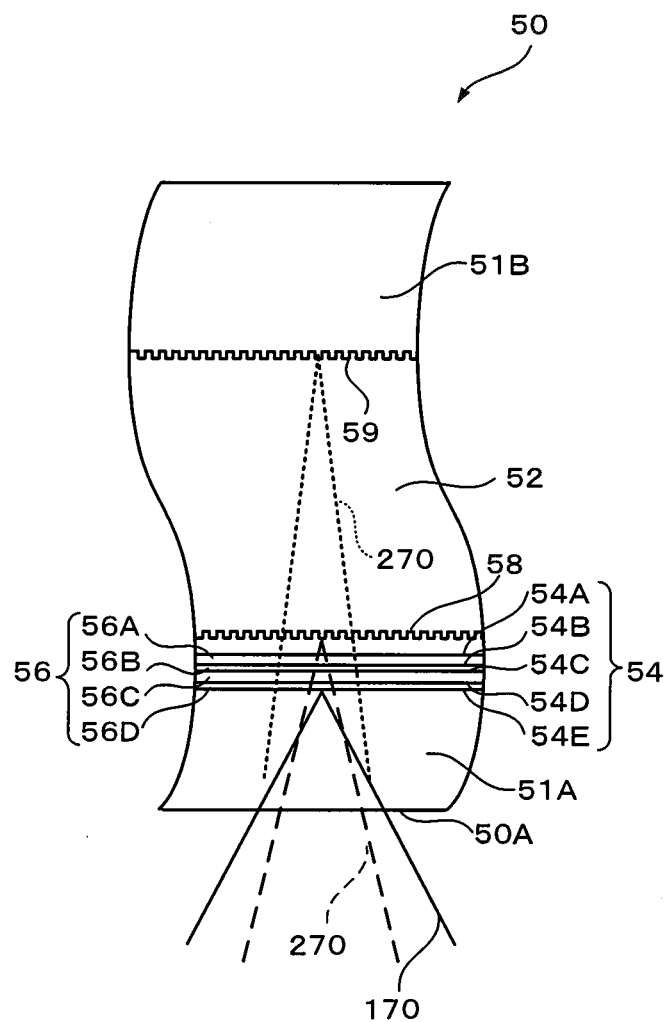
FIG. 5 is a cross-sectional view illustrating still another example of the stacking structure of the optical recording medium.

In the fourth optical recording medium 40, the recording and reading layer groups 44 and 45 are disposed on the respective sides of the support substrate 42, but it is not limitative. For example, as in a fifth optical recording medium 50 illustrated in FIG. 5, first and second servo layers 58 and 59 may be disposed on the respective sides of the support substrate 52 while a recording and reading layer group 54 may be disposed only on the same side as the first servo layer 58. In this case, a second cover layer 51B can directly be disposed on the surface of the second servo layer 59. When recording or reading is performed on the recording and reading layer group 54, it is preferred to irradiate the first and second servo layers 58 and 59 with a common beam 270 for tracking control.

In each of the optical recording media in the present embodiments, the number of stacked layers in the recording and reading layer group is 4 to 6, but the present invention is not limited thereto. In addition, the first distance and the second distance are alternately used as the interlayer distances between the recording and reading layers, but this is not a limitation. Three or more different interlayer distances may be appropriately used.

In the present embodiments, the red and blue beams having different wavelengths are used in the optical pickup 90, but the present invention is not limited thereto. Beams having the same wavelength may be used. In the above description, information is recorded on the recording and reading layer group such that the spiral direction is alternately changed in the stacking order. However, the spiral direction is not necessarily changed in an alternating manner.

The optical recording media and the optical recording-reading methods according to the present invention are applicable to various optical recording media including servo layers and recording and reading layers.

The entire disclosure of Japanese Patent Application No. 2010-35809 filed on Feb. 22, 2010 including specification, claims, drawings, and summary are incorporated herein by reference in its entirety.

What is claimed is:

1. An optical recording medium comprising:
a first servo layer having a projection and a depression for tracking control that are formed in a first spiral direction;
a second servo layer having a projection and a depression for tracking control that are formed in a second spiral direction opposite to the first spiral direction; and
a plurality of recording and reading layers having a flat structure with no projection and depression for tracking control, information being recorded on each of the plurality of recording and reading layers while tracking control is performed using the first servo layer or the second servo layer.

2. The optical recording medium according to claim 1, wherein the plurality of recording and reading layers include at least three recording and reading layers.

3. The optical recording medium according to claim 1, wherein the first and second servo layers are stacked at positions closer to a light incident surface of the optical recording medium than the plurality of recording and reading layers.

4. The optical recording medium according to claim 3, wherein the first and second servo layers have properties that allow the first and second servo layers to reflect long-wavelength light and to transmit short-wavelength light.

5. The optical recording medium according to claim 1, wherein the first and second servo layers are stacked at positions farther from a light incident surface of the optical recording medium than the plurality of recording and reading layers.

6. The optical recording medium according to claim 5, wherein the plurality of recording and reading layers have properties that allow the plurality of recording and reading layers to reflect short-wavelength light and to transmit long-wavelength light.

7. The optical recording medium according to claim 2, wherein interlayer distances between adjacent ones of the at least three recording and reading layers are set alternately to a first distance and a second distance different from the first distance.

8. The optical recording medium according to claim 3, wherein interlayer distances between adjacent ones of the at least three recording and reading layers are set alternately to a first distance and a second distance different from the first distance.

9. The optical recording medium according to claim 5, wherein interlayer distances between adjacent ones of the at least three recording and reading layers are set alternately to a first distance and a second distance different from the first distance.

10. The optical recording medium according to claim 6, wherein interlayer distances between adjacent ones of the at least three recording and reading layers are set alternately to a first distance and a second distance different from the first distance.

11. The optical recording medium according to claim 1, wherein a track pitch of the first servo layer or the second servo layer is set to a value twice a recording track pitch on the plurality of recording and reading layers to be recorded.

12. The optical recording medium according to claim 3, wherein a track pitch of the first servo layer or the second servo layer is set to a value twice a recording track pitch on the plurality of recording and reading layers to be recorded.

13. The optical recording medium according to claim 4, wherein a track pitch of the first servo layer or the second servo layer is set to a value twice a recording track pitch on the plurality of recording and reading layers to be recorded.

14. The optical recording medium according to claim 5, wherein a track pitch of the first servo layer or the second servo layer is set to a value twice a recording track pitch on the plurality of recording and reading layers to be recorded.

15. The optical recording medium according to claim 2, wherein information is recorded on an adjacent one of the at least three recording and reading layers in the first spiral direction under tracking control using the first servo layer and recorded on another adjacent one of the at least three recording and reading layers in the second spiral direction under tracking control using the second servo layer.

16. The optical recording medium according to claim 3, wherein information is recorded on an adjacent one of the at least three recording and reading layers in the first spiral direction under tracking control using the first servo layer and recorded on another adjacent one of the at least three recording and reading layers in the second spiral direction under tracking control using the second servo layer.

17. The optical recording medium according to claim 5, wherein information is recorded on an adjacent one of the at least three recording and reading layers in the first spiral direction under tracking control using the first servo layer and recorded on another adjacent one of the at least three recording and reading layers in the second spiral direction under tracking control using the second servo layer.

18. The optical recording medium according to claim 6, wherein information is recorded on an adjacent one of the at least three recording and reading layers in the first spiral direction under tracking control using the first servo layer and recorded on another adjacent one of the at least three recording and reading layers in the second spiral direction under tracking control using the second servo layer.

19. An optical recording-reading method used for an optical recording medium including a first servo layer having a projection and a depression for tracking control that are formed in a first spiral direction, a second servo layer having a projection and a depression for tracking control that are formed in a second spiral direction opposite to the first spiral direction, and a plurality of recording and reading layers having a flat structure with no projection and depression for tracking control, the method including irradiating one of the plurality of recording and reading layers with a recording beam to record information on the one of the plurality of recording and reading layers while one of the first and second servo layers is irradiated with a tracking beam to perform tracking control.

20. The optical recording-reading method according to claim 19, wherein information is recorded on an adjacent one of the plurality of recording and reading layers under the tracking control in the first spiral direction using the first servo layer and recorded on another adjacent one of the plurality of recording and reading layers under the tracking control in the second spiral direction using the second servo layer.

* * * * *